(12) United States Patent
Advani et al.

(10) Patent No.: US 12,740,503 B2
(45) Date of Patent: Sep. 22, 2026

(54) SEED CONVEYOR

(71) Applicant: Deere & Company, Moline, IL (US)

(72) Inventors: Gurmukh H. Advani, West Fargo, ND (US); Noel W. Anderson, Fargo, ND (US); Blake Hedrick, Champaign, IL (US)

(73) Assignee: Deere & Company, Moline, IL (US)

( * ) Notice: Subject to any disclaimer, the term of this patent is extended or adjusted under 35 U.S.C. 154(b) by 149 days.

(21) Appl. No.: 18/779,144

(22) Filed: Jul. 22, 2024

(65) Prior Publication Data

US 2026/0020518 A1 Jan. 22, 2026

(51) Int. Cl.
*A01C 7/20* (2006.01)
*A01C 7/08* (2006.01)
*A01C 7/10* (2006.01)

(52) U.S. Cl.
CPC ................ *A01C 7/10* (2013.01); *A01C 7/084* (2013.01); *A01C 7/085* (2013.01); *A01C 7/206* (2013.01)

(58) Field of Classification Search
CPC ........... A01C 7/10; A01C 7/084; A01C 7/085; A01C 7/206
USPC .......................................................... 198/301
See application file for complete search history.

(56) References Cited

U.S. PATENT DOCUMENTS 5,052,627 A * 10/1991 Balmer ................ A01C 15/122 239/655
6,047,652 A * 4/2000 Prairie .................. A01C 7/081 406/146
7,104,207 B2 * 9/2006 Wake ..................... A01C 7/081 222/129
8,396,632 B2 * 3/2013 Burke ................ A01D 41/1217 701/50
8,882,428 B2 * 11/2014 Fikes ...................... B63B 27/34 414/142.2
9,297,215 B2 * 3/2016 Craik .................... E21B 17/028
9,615,506 B2 * 4/2017 Ruppert .............. A01M 9/0053
9,907,224 B2 * 3/2018 Rosengren ............... A01C 7/20
2006/0045701 A1 * 3/2006 Dillon ................ A01D 41/1208 414/526

(Continued)

FOREIGN PATENT DOCUMENTS

GB 2231767 A * 11/1990 ............. A01K 61/80

OTHER PUBLICATIONS

Bombardier Challenger 605—Fuel System, (33 pages) (undated but admitted to be prior art).

*Primary Examiner* — Gene O Crawford
*Assistant Examiner* — Lester Rushin, III
(74) *Attorney, Agent, or Firm* — Andrew T. Ball; Lucian Wayne Beavers; Patterson Intellectual Property Law, PC

(57) ABSTRACT

Disclosed herein are tank assemblies, and particularly tank assemblies including conveyors for the transfer of granular materials, such as seeds. Such conveyors can include a conduit through which the granular material is moved, and a rotatable auger configured to move the seeds through the conduit. Also disclosed herein are control systems and methods for the operation of the tank assemblies and particularly the conveyors disclosed herein. According to certain aspects of the disclosure, the control methods may implement signals from one or more sensors to monitor the level of the granular material in the tank assemblies, and control signals to operate the conveyors to arrive at targeted levels of granular material in the tank assemblies.

19 Claims, 8 Drawing Sheets

(56) References Cited

U.S. PATENT DOCUMENTS

| | | | | |
|---|---|---|---|---|
| 2023/0119569 | A1* | 4/2023 | Koch | A01B 79/005 702/2 |
| 2024/0025676 | A1 | 1/2024 | Harmon | |
| 2024/0265791 | A1* | 8/2024 | Kuhns | A01D 43/07 |

* cited by examiner 248
220,220b
238
232
252
250
230
258
254
218
260
256
220,220a

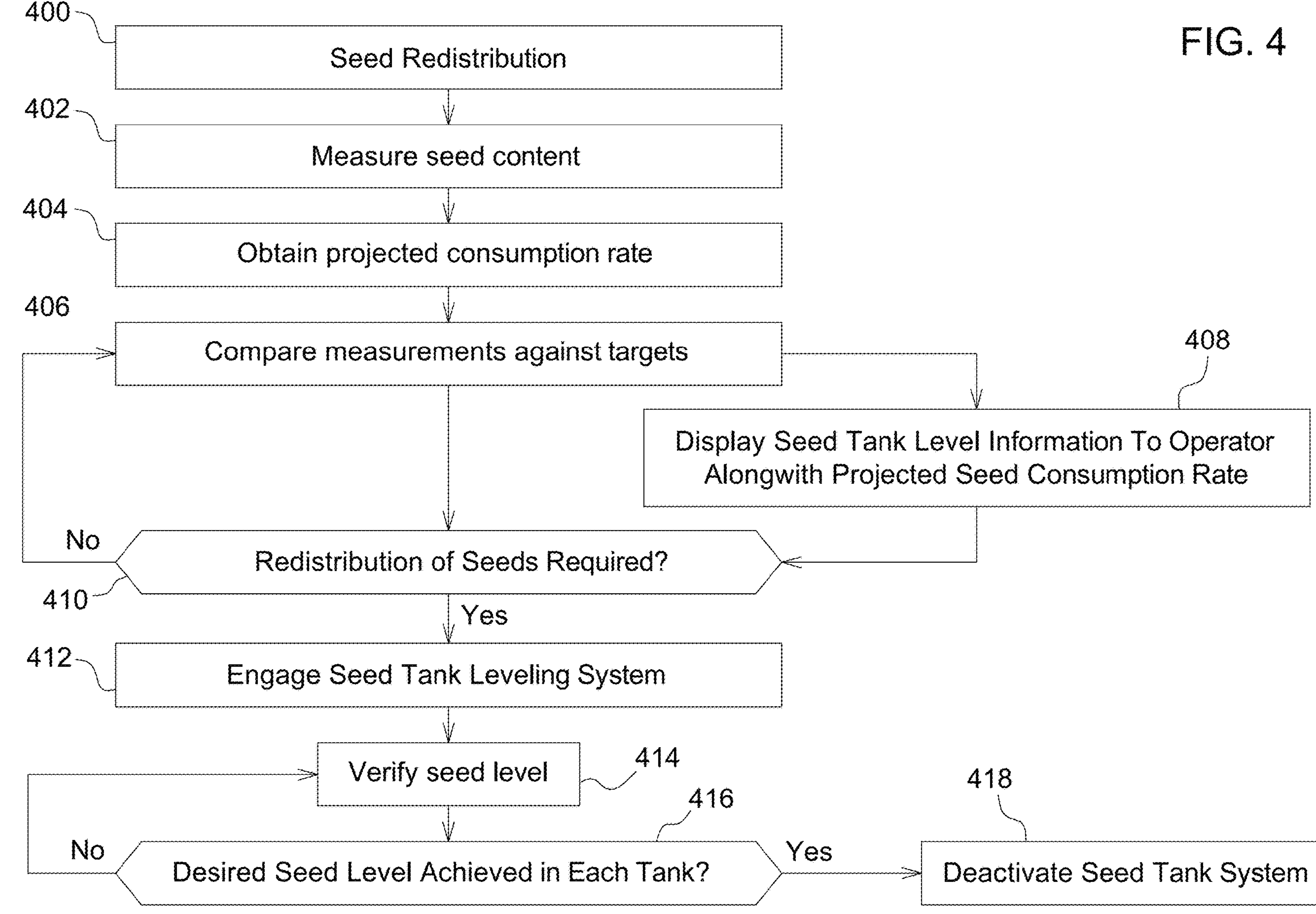
FIG. 4
400
Seed Redistribution
402
Measure seed content
404
Obtain projected consumption rate
406
Compare measurements against targets
408
Display Seed Tank Level Information To Operator Alongwith Projected Seed Consumption Rate
410
Redistribution of Seeds Required?
No
Yes
412
Engage Seed Tank Leveling System
414
Verify seed level
416
Desired Seed Level Achieved in Each Tank?
No
Yes
418
Deactivate Seed Tank System

SEED CONVEYOR

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD

The present disclosure relates to conveyor or discharge systems for transferring granular materials, assemblies, such as tank assemblies on work vehicles, comprising the same, and methods for controlling the contents of such tank assemblies using the disclosed conveyor systems.

BACKGROUND OF THE INVENTION

Seeder machines are work tools capable of the mechanized planting of seeds. Generally, the seeds are stored in tanks mounted to the seeder machine, and connected to one or more planting heads, which receive a supply of seeds from the tanks. As the seeder machine moves, the planting heads transfer the seeds from the machine to the soil.

However, in seeder machines with two or more tanks, the tanks are subject to certain challenges. For example, a planting operation may exhaust the seeds of one tank faster than the seeds of another, which in turn may require work to be paused and the tanks to be reloaded at different times. Furthermore, the desired weight and balance of the portions of the seeder machine supporting the tanks may vary, for example if the seeder machine is on an inclined or sloped worksite, or if a portion of the seeder machine is being moved over a portion of the worksite that should be exposed to comparatively low loads.

Additionally, changing between seed types (for example, between different crop variety or between different hybrids within one crop variety) held in the seed tanks between planting operations can be time consuming, and can require the vehicle operator to manually open a hatch at the bottom of the tank and to manually empty the tanks with gravity assistance, so that a new kind of seed can be added to the tank once the original contents have been emptied.

All such requirements delay a planting operation and consume operator time. Furthermore, such existing methods may lead to seed wastage, and operator exposure to chemicals used to treat or coat seeds. What is needed, therefore, is an improved apparatus for transferring granular materials between tanks, apparatus for material entry and exit from individual tanks, and methods for using the same.

BRIEF SUMMARY

Disclosed herein are example tank assemblies comprising a conveyor for granular materials, and methods for using the same. According to a general example, the tank assemblies comprise two or more tanks, with a conveyor extending between the tanks. The conveyor can be operated to transfer a granular material between the tank and can be manually or automatically operated. Also disclosed herein are tanks having a conveyor for granular materials configured to expel the granular material from the tanks. Also disclosed herein are controllers for the automatic control of the conveyors associated with the disclosed tank assemblies, and methods of using the same.

Certain examples concern a tank assembly for a work vehicle. The tank assembly includes a first tank attached to and in communication with a granular material applicator and a second tank attached to and in communication with the granular material applicator. The tank assembly also includes a first sensor associated with the first tank and a second sensor associated with the second tank. The tank assembly also includes a conveyor connecting the first tank to the second tank and configured to move a granular material between the first tank and the second tank.

Certain examples concern a method for controlling granular material levels of a granular material applicator comprising a first tank, a second tank, and a conveyor extending between the first tank and the second tank. The method includes measuring a first granular material quantity of the first tank, measuring a second granular material quantity of the second tank, obtaining a target granular material quantity state, calculating an empirical granular material state based on the measured first granular material quantity and the measured second granular material quantity, comparing the empirical granular material state to the target granular material quantity state, and driving the conveyor to convey a portion of the first granular material quantity to the second tank or the second granular material quantity to the first tank when the empirical granular material state is different from the granular material target state, such that the difference between the empirical granular material state and the granular material target state is reduced. Certain examples concern a tank assembly comprising a tank defining an enclosure configured to receive a granular material, an egress port, a conveyor positioned towards a bottom portion of the tank and extending between the egress port and the enclosure of the tank, wherein operation of the conveyor expels the granular material from the enclosure.

In some examples, the granular material comprises seeds.

In some examples, the granular material applicator is a seeder.

Numerous objects, features and advantages of the embodiments set forth herein will be readily apparent to those skilled in the art upon reading of the following disclosure when taken in conjunction with the accompanying drawings.

BRIEF DESCRIPTION OF THE DRAWINGS

FIG. 4 is a flowchart outlining a control method according to one aspect of the present disclosure.

DETAILED DESCRIPTION OF THE INVENTION

General Terms

Figure 1:
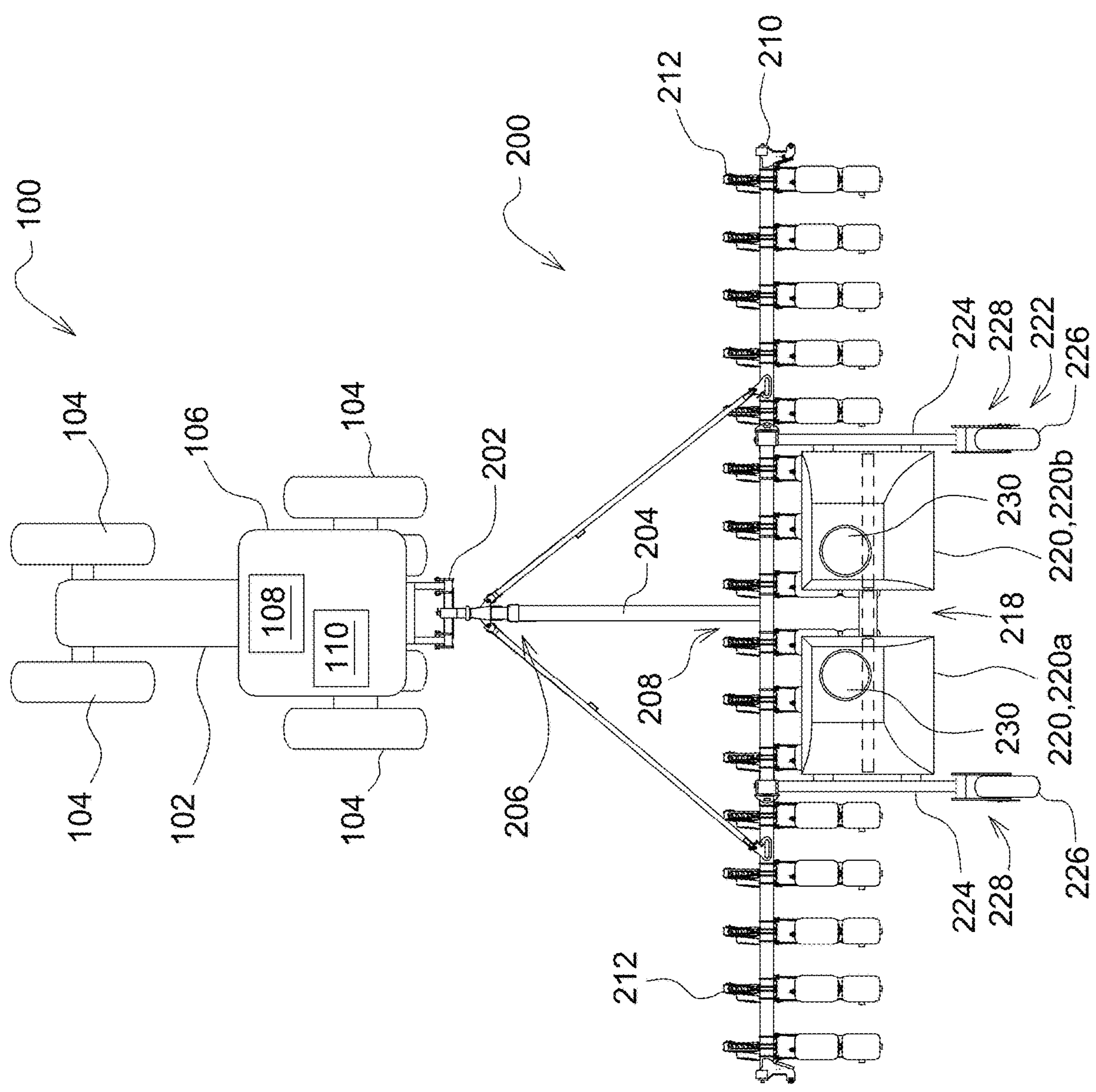
FIG. 1 is a schematic diagram of a work vehicle and work tool according to one aspect of the present disclosure.

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

Introduction to the Disclosed Technology

Disclosed herein are aspects of a seed transfer assembly. The seed transfer assemblies disclosed herein can generally comprise a conveyor and a controller associated with the conveyor. Conveyors disclosed herein may be mechanical (for example, including a rotationally driven auger), or pneumatic (for example, including a blower and/or vacuum system) In a general example, the conveyor connects and is in communication with two or more tanks. The tanks define an enclosure that contains a granular material (for example, seeds, granular fertilizer, granular herbicides and pesticides, etc.), which can be moved between the tanks by the conveyor.

According to some aspects of the present disclosure, the seed transfer assembly further includes a sensor or sensors associated with the tanks. The sensors are, in a general example, configured to measure the amount of material in the tanks and to transmit such information to a controller, and can include weight sensors, level sensors, or other sensors suitable for determining the amount of granular material in the tanks.

It will be appreciated that, while in some aspects of the present disclosure, the seed transfer assembly is described as being controlled by computer or controller, such seed transfer assemblies can be manually controlled by a vehicle operator. Moreover it will also be appreciated that, while in some aspects of the present disclosure, the seed transfer assembly is described as being driven by a motor, such assemblies can also be manually operated in some cases, for example, by a crank or by manual activation of the pneumatic blower and/or vacuum systems previously discussed.

The seed transfer assemblies disclosed herein can, according to one aspect of the present disclosure, be mounted on or otherwise operationally attached to a work vehicle, such as a work vehicle including a granular material applicator.

Also disclosed herein are tank assemblies including an expeller. The expeller, according to a general example, is open to the interior of a tank and connected to an exterior of a tank, such as by an egress port. The expeller can, according to one example, include a conveyor suitable for moving a granular material, such as seeds. The expeller, in a general example, is configured to convey the granular material from the interior of the tank to the exterior of the tank.

The expeller can be associated with a controller or computer, which can control the operation of the expeller. The expeller can operate according to user inputs, remote signals, or predetermined programming.

Aspects of the Disclosed Technology

Referring now to the drawings, FIG. 1 shows a work vehicle 100, which according to various aspects of the present disclosure can be used with a work tool, described in greater detail herein, which can include one or more of the seed transfer system, the tank assemblies, or the expeller, and can be operated according to the methods described in greater detail herein.

As shown in FIG. 1, the work vehicle 100 can include a vehicle chassis 102 and ground engagement features 104 attached to the vehicle chassis 102. As shown in FIG. 1, the ground engagement features 104 can be wheels in some examples, but it will be appreciated that in other examples, the ground engagement features 104 can have a different form, such as tracks or treads.

The work vehicle 100 also comprises an operator cab 106, mounted to the vehicle chassis 102. The operator cab 106 can include one or more features for the operation of the work vehicle 100, including steering and driving controls 108 and a control station 110, which according to a general example are positioned within reach of a user during the operation of the work vehicle 100.

In some examples, the work vehicle 100 is configured to attach to and assist in the operation of various working tools. In such examples, the work vehicle 100 can be attached or hitched to a work tool 200, such that the work vehicle 100 can move the work tool 200 within a worksite. According to some aspects of the present disclosure, the work tool 200 can be a granular material applicator 200, such as the seed applicator illustrated in FIG. 1. It will be appreciated to one of ordinary skill in the art that, where reference is made in the present disclosure to a granular material applicator, such devices include seeders, such as the seeders disclosed in particular examples, as well as applicators suitable for application and/or dispensation of granular fertilizer, granular herbicides and pesticides, etc.

According to one aspect of the present disclosure, the work tool 200 is connected to the work vehicle at a hitch 202. The hitch 202 allows the work tool 200 to be releasably attached to the work vehicle 100 during a work period, and detached from the work vehicle 100 after the work (for example, the planting of seeds) is completed, freeing the work vehicle 100 for use in other tasks.

According to one aspect of the present disclosure, the work tool 200 also includes a limber 204 extending at a first end portion 206 from the hitch 202 away from the work vehicle 100 towards a second end portion 208 which can be connected to a boom 210 of a granular material applicator 200. In such examples, the limber 204 can serve to space the granular material applicator 200 apart from the work vehicle 100, and ensure that the granular material applicator 200 follows in a path driven by the work vehicle 100.

With continued reference to FIG. 1, the granular material applicator 200 includes a plurality of planter heads 212 spaced apart from each other along the boom 210. According to one example of the present disclosure, the plurality of planter heads 212 extend downwards from the boom 210 towards the ground, such that a planting tool can engage the soil and plant seeds therein.

According to one aspect of the present disclosure, the granular material applicator 200 also includes a tank assembly 218, which includes tanks 220. For example, as illustrated in FIG. 1, the granular material applicator 200 includes a first tank 220*a* and a second tank 220*b*. The tank assembly 218 can, in some examples, contain an expendable material, such as a seed stock for planting. The tank assembly 218 is operatively connected to the planter heads, such that the tank assembly 218 can supply the expendable material to the planter heads 212 as the work tool 200 is moved and operated. For example, the tank assembly 218 can be connected to the plurality of planter heads 212 by a pneumatic system that conveys seeds from the tanks 220 to the plurality of planter heads 212. It will be appreciated that, in other examples, other conveyance methods may be used to transfer seeds from the tanks 220 to the planter heads 212.

According to some aspects of the present disclosure, such as that shown in FIG. 1, the tank assembly 218 can be supported on a wheeled support structure 222. In some examples, the wheeled support structure 222 can include wheeled support members 224 that extend rearward from the boom 210 and which support the tank assembly 218 from beneath. As shown in FIG. 1, the wheeled support members 224 can also include a wheel 226 at a wheeled end portion 228, which facilitate the movement of the work tool 200, for example when the work tool 200 is pulled behind the work vehicle 100. It will be appreciated that, while the example work tool 200 shown in FIG. 1 includes a wheeled support structure 222 that supports the tank assembly 218 from underneath, it is possible to arrange the components of the wheeled support structure 222 such that the tank assembly 218 is supported from the sides, or from the top.

It will be appreciated that, while FIG. 1 depicts a work tool 200 (that is, a drawn planter) that is releasably attached to and moved by a work vehicle 100 that is separate from the work tool 200, and that the work tool 200 includes a seed tank assembly including one or more of the seed transfer assemblies and/or expellers disclosed herein, the same seed transfer assemblies and/or expellers may be mounted to and operationally associated with a work vehicle that is permanently and/or integrally associated with the work tool, rather than releasably attached to the work tool, such as a mounted planter.

Figure 2A:
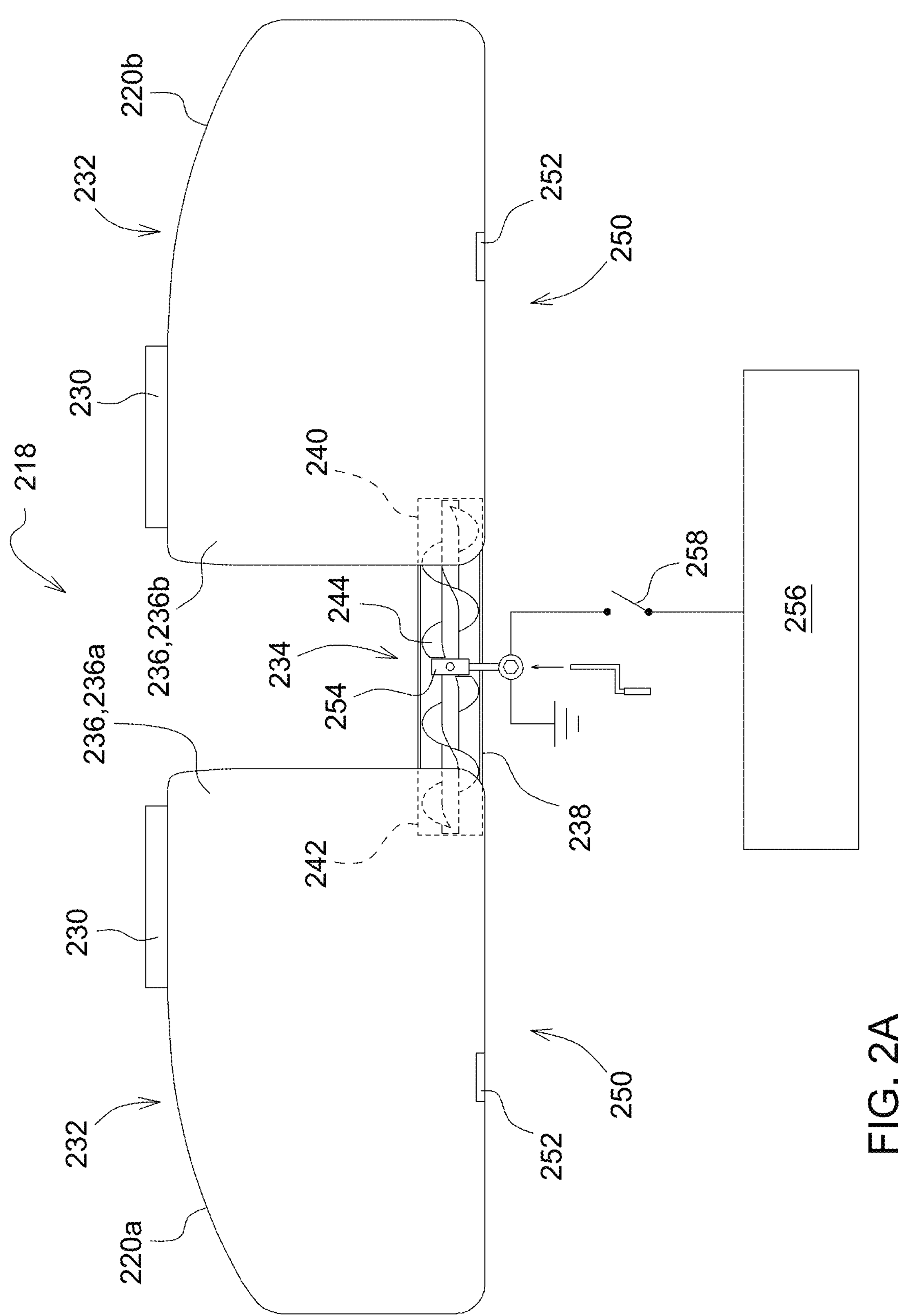
FIG. 2A is a schematic diagram showing a tank assembly with conveyor according to one aspect of the present disclosure.
Figure 2B:
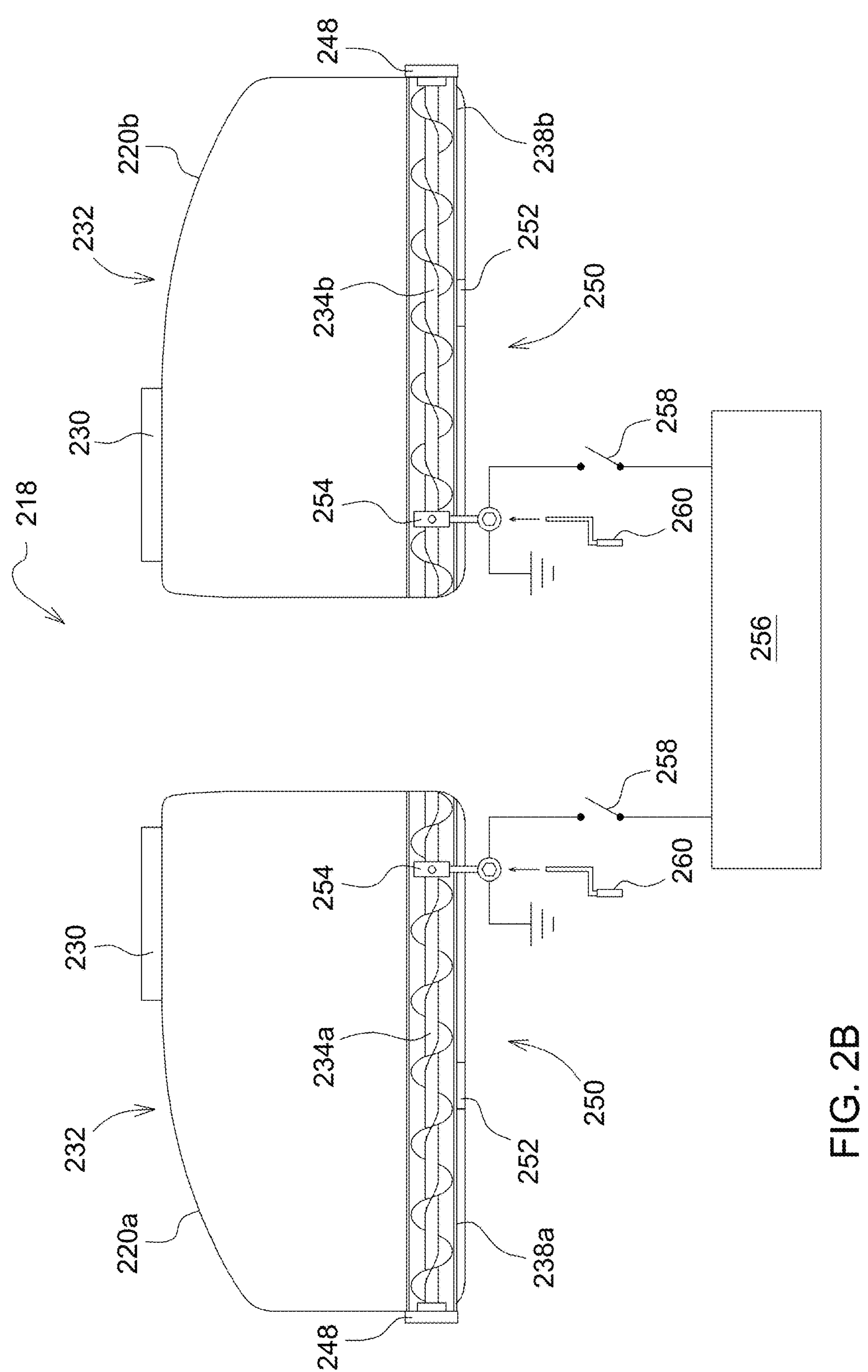
FIG. 2B is a schematic diagram showing a tank assembly with conveyors according to another aspect of the present disclosure.
Figure 2C:
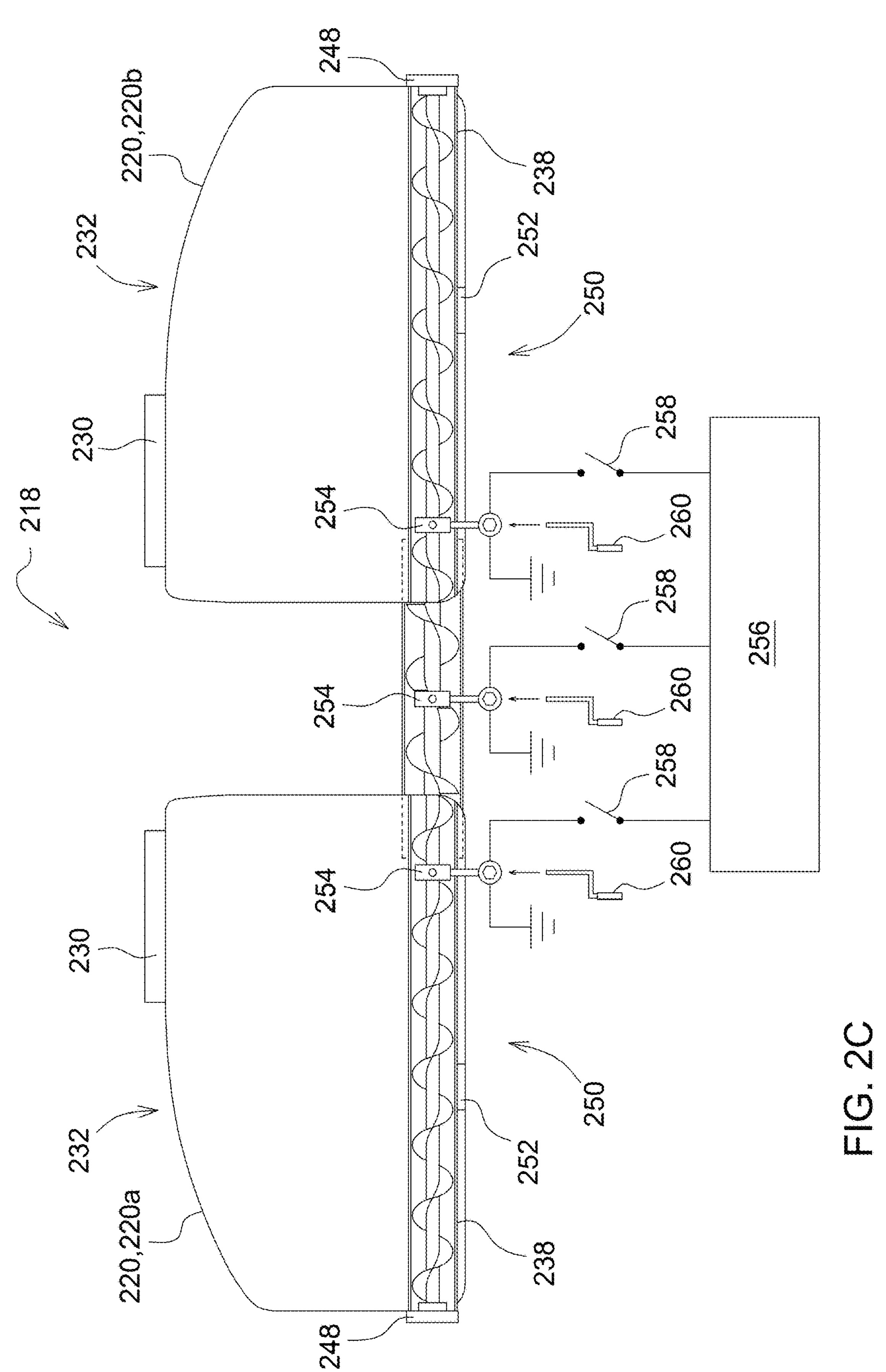
FIG. 2C is a schematic diagram showing a tank assembly with conveyors according to another aspect of the present disclosure.

Specific arrangements and features of the tank assembly 218, including various conveyance systems, are shown in greater detail in FIGS. 2A-2C. As shown throughout FIGS. 2A-2C, the tanks 220 of the tank assembly 218 can include a loading port 230, which allows the expendable material (such as the seed stock) to be added to the tanks 220. According to one aspect of the present disclosure, the loading ports 230 of the tanks 220 can be positioned towards a top end 232 of the tank, as shown in FIGS. 2A-4. It will be appreciated that in other examples, the loading port 230 can be positioned elsewhere on the tanks 220, such as along a side portion of the tanks 220.

With continued reference to FIG. 2A, the tank assembly 218 can also include a conveyor 234 extending between the first tank 220*a* and the second tank 220*b*. As shown in FIG. 2A, the conveyor extends from an interior portion 236*a* of the first tank 220*a* to an interior portion 236*b* of the second tank 220*b*, thereby interconnecting the internal volume of the first tank 220*a* to the second tank 220*b*. In a general example of the present disclosure, the conveyor 234 is configured to transfer a granular material, such as seeds, from the interior portion 236*a* of the first tank 220*a* to the interior portion 236*b* of the second tank 220*b*, or from the interior portion 236*b* of the second tank 220*b* to the interior portion 236*a* of the first tank 220*a*.

According to one aspect of the present disclosure, the conveyor 234 can be a mechanically driven and/or rotary conveyor. For example, as shown in FIG. 2A, the conveyor 234 can include a conduit 238, open at a first end 240 and a second end 242 to the first tank 220*a* and the second tank 220*b*, respectively. The conveyor 234 can also include an auger 244 positioned within the conduit 238.

In some examples, the tank assembly 218 can include a conveyor 234 having an auger 244 configured to operate in two directions. Specifically, when the auger 244 is driven in a first rotational direction (that is, clockwise or counterclockwise), the auger 244 can transfer a granular material such as seeds from the first tank 220*a* through the conduit 238 to the second tank 220*b*. When the auger 244 is driven in a second rotational direction opposite to the first rotational direction (that is, counterclockwise or clockwise), the auger 244 can transfer the granular material such as seeds from the second tank 220*b* through the conduit 238 to the tanks 220.

Alternatively, the tank assembly 218 can include two conveyors 234, each with an auger 244 configured to operate in one direction. Specifically, the conveyor 234 can include a first conduit 238 and a second conduit 238. A first auger 244 can be positioned in the first conduit 238 and configured to move a granular material such as seeds from the first tank 220 to the second tank 220 through the first conduit 238. A second auger 244 can be positioned in the second conduit 238 and configured to move a granular material such as seeds from the second tank 220 to the first tank 220 through the second conduit 238. Other examples of granular materials, without limitation, include granular fertilizers; granular pesticides, herbicides, fungicides, nematicides, etc; and granular soil amendments.

Mechanically actuated conveyors such as those described herein can be operated by a motor, such as the electric motor 254 shown in FIGS. 2A-2C. The electric motor 254 can be electrically connected to a power source 256, and can be activated and deactivated by use of a switch 258 which can be operated manually, or by a controller such as those disclosed herein. In some examples, the mechanically actuated conveyors such as those described herein can also be manually operated, for example by a crank 260 as shown in FIGS. 2A-2C. The crank 260 can be included in addition to or in lieu of the electric motor 254. In other examples, the mechanically actuated conveyor may be driven by a hydraulic motor, a belt drive connected to an engine or ground wheel, or a drive shaft connected to an engine or ground wheel.

Figure 2D:
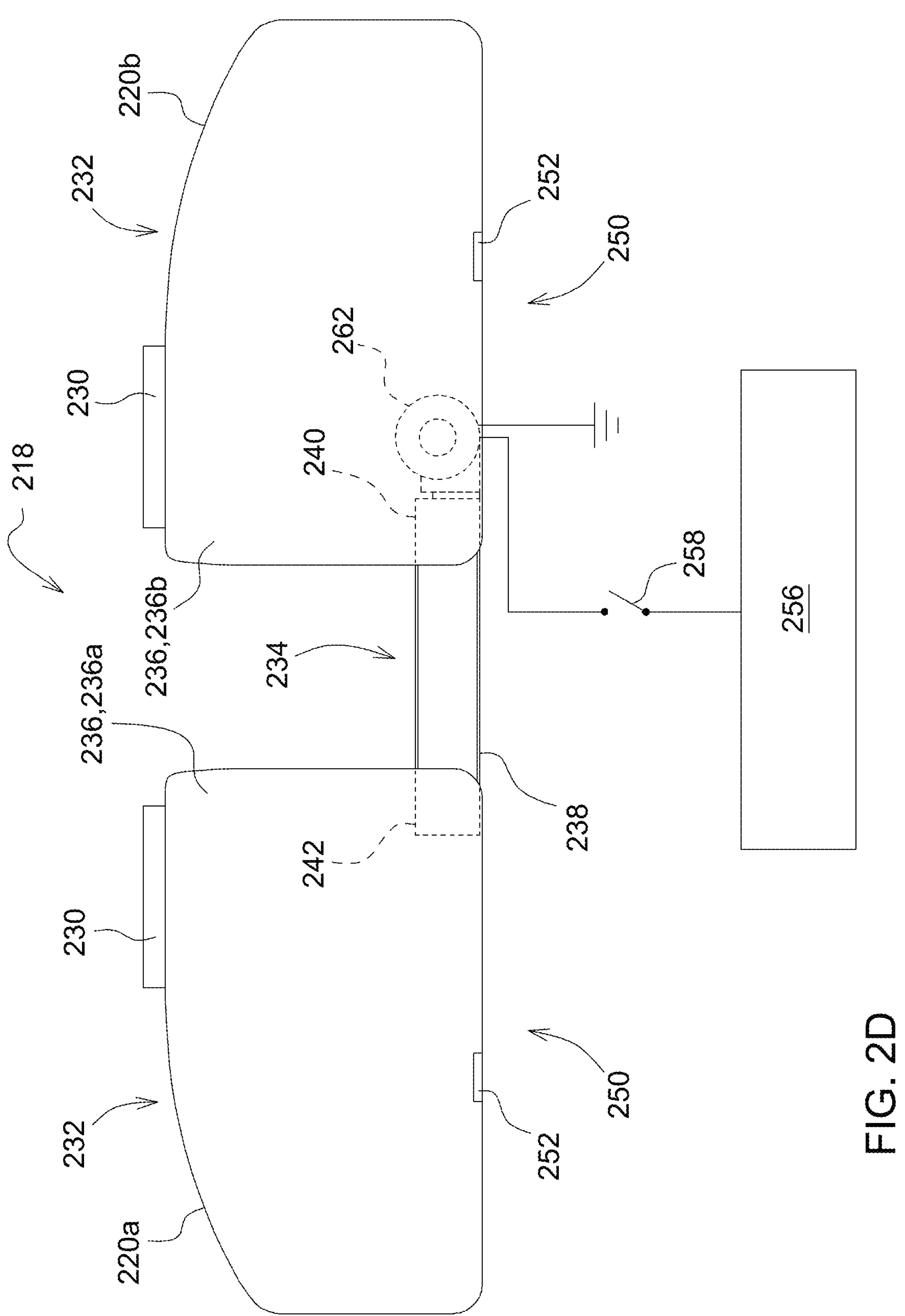
FIG. 2D is a schematic diagram showing a tank assembly with a pneumatic or vacuum conveyor according to one aspect of the present disclosure.

According to one aspect of the present disclosure, such as that shown in FIG. 2D, the tank assembly 218 can include a pneumatic conveyor 234 in lieu of or in addition to a mechanical conveyor 234. In such examples, the conveyor 234 can include pneumatic conduit, such as a pipe or hose, that connects the first tank 220*a* to the second tank 220*b*, and a blower 262 connected to the pneumatic conduit and configured to blow the granular material from the first tank 220*a* to the second tank 220*b* and/or from the second tank

220*b* to the first tank 220*a*. As will be appreciated, the pneumatic conveyor may comprise a vacuum system in addition to or in lieu of a blower system.

Also disclosed herein are examples of a tank assembly 218 which include one or more conveyors 234 configured to expel a granular material from a tank 220. For example, as illustrated in FIG. 2B the first tank 220*a* can be associated with a first conveyor 234*a* and the second tank 220*b* can be associated with a second conveyor 234*b*. The first conveyor 234*a* and the second conveyor 234*b* can each include a conduit 238 and an auger 244 disposed within the conduit 238.

As shown in FIG. 2B, the conduit 238 can be open to the interior portion 236 of the tank 220 with which they are associated, and may also be connected to an egress port 248 which opens to the outside of the tank 220. The rotational movement of the auger 244 within the conduit 238 will drive the granular material from the interior portion 236 of the tanks 220 and out through the egress port 248.

According to one aspect of the present disclosure, the conveyors 234 configured for expelling granular materials from the tanks 220 are generally positioned at a bottom portion 250 of the tanks 220 with which they are associated. Advantageously, this allows the conveyor 234 to be gravity fed, that is, the granular material will collect towards the bottom of the tank 220, will enter the conveyor 234, and will be expelled through the egress port 248.

According to one aspect of the present disclosure, illustrated in FIG. 20, a tank assembly 218 can include both one or more conveyors 234 configured to transfer a granular material such as seeds between the first tank 220*a* and the second tank 220*b*, and one or more conveyors 234 configured to expel the granular material from the tank 220 with which it is associated.

Such conveyors 234, when configured to transfer a granular material between the tanks 220, advantageously allow the granular material such as seeds to be passed between the first tank 220*a* and the second tank 220*b* without the need for an operator to remove the granular material from either tank 220 to add it to the other tank 220. Likewise, when the conveyors 234 are configured to expel a granular material such as seeds from the tank 220 with which they are associated, the tanks 220 can be emptied, for example, as needed to switch between different kinds of seeds, or otherwise as needed at the end of a planting operation, without the operator needing to manually open a door or hatch at the bottom of the tank.

Instead, an operator can control the operation of the conveyor 234 to move the granular material as desired. This control can be achieved manually, for example, by turning a crank to actuate the auger 244, in the case of a mechanically actuated conveyor 234 or by activating a vacuum or blower, in the case of a pneumatic conveyor 234. Additionally, as will be discussed in greater detail below, the control and operation of the conveyor 234 can be accomplished automatically or remotely with human input, by using a controller which may operate based on an input, such as a programmed or algorithmic input, or based on input signals delivered in response to an operator action (such as pushing a button, activating a switch, or issuing a remote command). Automatic control may have varying levels of human supervision ranging from required human confirmation of any action to human supervision of automated control to fully autonomous operation.

In some examples, this combination of features allows for a reduction in the complexity and effort of loading a tank assembly, such as the tank assembly 218, by allowing a user to load a single tank 220 of the tank assembly 218, and subsequently transferring seeds to other tanks 220 through the one or more conveyors 234.

According to one aspect of the present disclosure, illustrated in FIGS. 2A-2C, the tank assembly 218 can also include one or more tank sensors 252, sometimes called quantity sensors 252, which are associated with the tanks 220, and provide information on the quantity of material in the tanks 220 (such as weight, volume, level, count, and so on) about the quantity of the granular material such as seeds within the tanks 220. According to one aspect of the present disclosure, the tank sensors 252 can be weight sensors configured to measure the net weight of the contents of the tanks 220. It will be appreciated, however, that the tank sensors 252 can be other types of sensor such as optical sensors, laser sensors, ultrasonic sensors, or any other sensor types suited for use as granular material level sensors (that is, to directly measure the level of the seeds or other granular materials in the tank) which may be used alongside or in lieu of a weight sensor.

Such tank sensors 252 can be in communication with, for example the control station 110 in the operator cab 106 of the work vehicle 100, previously discussed. The tank sensors 252 can, in such cases, transmit signals to the control station 110 allowing the quantity of the granular material within each tank 220 to be presented to the vehicle operator, which may be advantageous in allowing the operator to decide when and how to operate the conveyor or conveyors 234.

Figure 3:
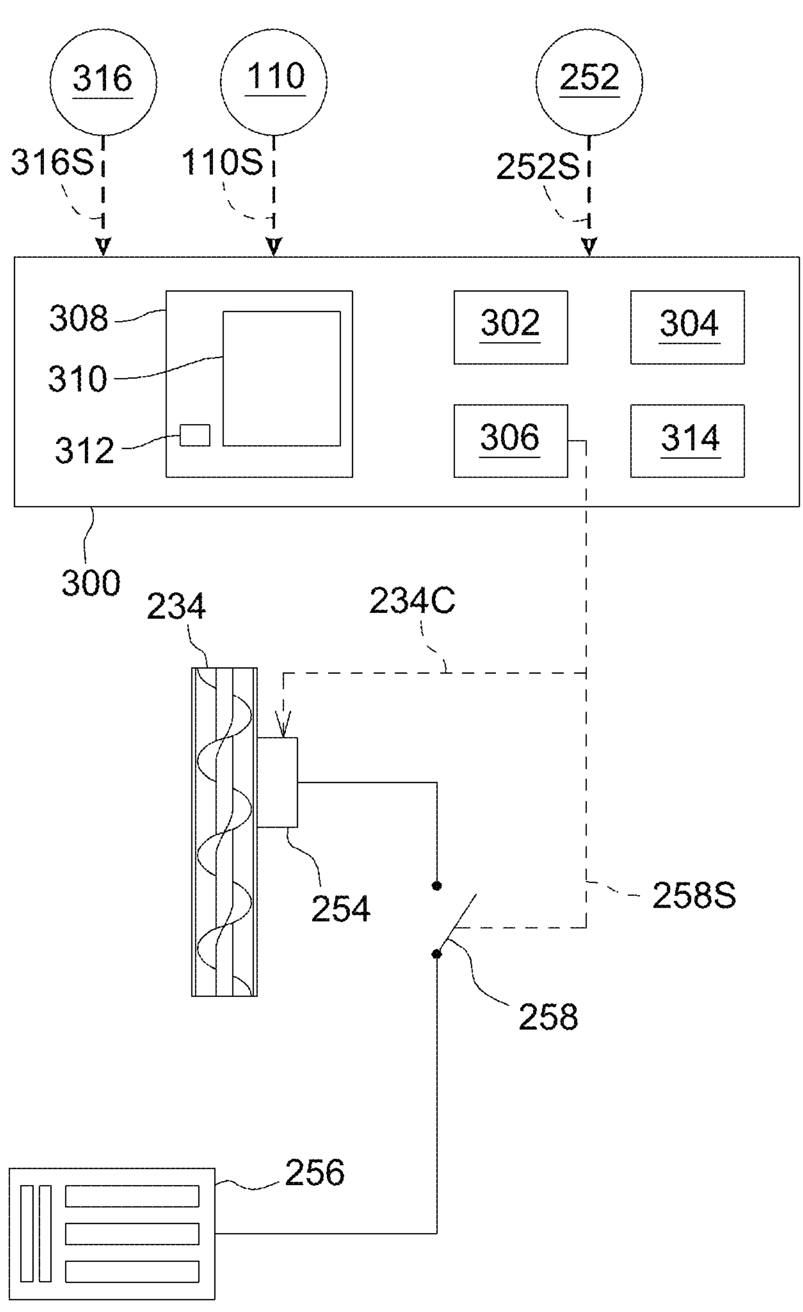
FIG. 3 is a schematic diagram of a controller for use with the tank assemblies disclosed herein.

The tank sensors 252 can also be in communication with a controller, such as the controller 300 shown in FIG. 3. The controller 300 can be configured for the computerized operation, either automatic or partially automated, of the conveyor 234 devices disclosed herein in relation to the discussion of the tank assembly 218.

The controller 300 includes or may be associated with a processor 302, a computer readable medium 304, a database 306 and an input/output module or control panel 308 having a display 310. The control panel 308 may be a part of the control station 110 in the operator cab 106. An input/output device 312, such as a keyboard, joystick or other user interface, can be provided so that a human operator may input instructions to the controller 300. It is understood that the controller 300 described herein may be a single controller having the described functionality, or it may include multiple controllers wherein the described functionality is distributed among the multiple controllers. Some or all of the controllers may be located at a location other than the work vehicle and be connected wirelessly.

Various operations, steps or algorithms as described in connection with the controller 300 can be embodied directly in hardware, in a computer program product 314 such as a software module executed by the processor 302, or in a combination of the two. The computer program product 314 can reside in RAM memory, flash memory, ROM memory, EPROM memory, EEPROM memory, registers, hard disk, a removable disk, or any other form of computer-readable medium 304 known in the art. An exemplary computer-readable medium 304 can be coupled to the processor 302 such that the processor 302 can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

According to one aspect of the present disclosure, illustrated in FIG. 3 the controller 300 is configured to receive one or more input signals and to produce and transmit one or more output signals in response to or based in part on the input signals.

When the work tool 200 includes a tank assembly 218 with one or more tank sensors 252 associated with the tanks 220, the tank sensors 252 can transmit one or more tank sensor signals 252S to the controller 300. The signal can contain various data based on the specific nature of the tank sensor 252. For example, when the tank sensors 252 include weight sensors, the one or more tank sensor signals 252S can include weight data for one or more of the tanks 220 of the tank assembly 218. Similarly, when the tank sensors 252 include optical and/or laser sensors, the one or more tank sensor signals 252S can include a granular material level signal that includes data on the height or volume of a material inside the tanks 220.

According to one aspect of the present disclosure, the controller 300 can also receive signals from the operator, for example input, such as a control station signal 110S from the control station 110 of the work vehicle 100, or a mobile device signal 316S from a mobile device 316. Such signals 110S, 316S may include operator commands, such as start/stop commands, or manual instructions to activate and/or control the conveyor(s) 234 of the tank assembly 218.

The controller 300 may also be configured and/or programmed to calculate one or more control factors based at least in part on the various input signals received. These signals may include but are not limited to tank weight, seed level, exhaustion rate, soil compaction, and/or vehicle stability. According to one aspect of the present disclosure, the controller 300 may, using the one or more tank sensor signals 252S, calculate a tank exhaustion rate (a seed exhaustion rate, for example, when the tanks 220 contain seeds for planting) from data on content weight and/or level of the material, and particularly the granular material material in the tanks 220. The tank exhaustion rates calculated by the controller 300 can, in some examples, be associated with individual tanks 220. For example, when the tank assembly 218 includes first tank 220*a* and second tank 220*b*, the controller 300 can calculate a first tank exhaustion rate associated with the first tank 220*a* and a second tank exhaustion rate associated with the second tank 220*b*. It will be appreciated that, in some examples, the tank exhaustion rate may vary as a function of time, or as a function of the location of the work vehicle 100 within a worksite.

According to one aspect of the present disclosure, the tank exhaustion rates calculated by the controller 300 can also be used to predict and/or project a depletion point, that is a time or a location or a distance at which the contents of the tanks 220 are fully exhausted or depleted. The projected depletion points can, in some examples, be associated with individual tanks 220. For example, when the tank assembly 218 includes first tank 220*a* and second tank 220*b*, the controller 300 can calculate a projected first tank depletion point based on the first tank exhaustion rate and a projected second tank depletion point based on the second tank exhaustion rate, with the projected first and second tank depletion points associated with the first tank 220*a* and the second tank 220*b* respectively.

According to one aspect of the present disclosure, the controller 300 can use any combination of the tank exhaustion rates or the projected tank depletion points, alone or jointly, to prepare control signals for the tank assembly 218, and particularly for the one or more conveyors 234 of the tank assembly 218. More particularly, the controller 300 can receive continual signals from the tank sensors 252 that indicate the changing quantity of granular material in the tanks 220 of the tank assembly 218, for example, during an ongoing application operation. In one example, the changing quantity of seeds in a planting operation.

According to one aspect of the present disclosure, the controller 300 can be configured to adaptively control the one or more conveyors 234 of the tank assembly 218, to achieve a result wherein the tanks 220 of the tank assembly 218 empty at the same or approximately the same point. Particularly in such examples where the controller 300 uses the measured and/or calculated tank exhaustion rates or the projected tank depletion points, the controller may also be configured to compare the depletion points for each of the tanks 220 of the tank assembly 218. For example, in an example tank assembly 218 with a first tank 220*a* and a second tank 220*b*, the controller 300 may compare the projected first tank depletion point and the projected second tank depletion point, and accordingly prepare conveyor control signals 234C for the one or more conveyors 234. When the projected first tank depletion point is longer or farther than the projected second tank depletion point, the controller 300 can control the one or more conveyors 234 to transfer seeds from the first tank 220*a* to the second tank 220*b*, and when the projected second tank depletion point is longer or farther than the projected first tank depletion point, the controller 300 can control the one or more conveyors 234 to transfer granular material such as seeds from the second tank 220*b* to the first tank 220*a*.

Because the controller 300 can be configured to continually reassess the tank exhaustion rates (such as the first tank exhaustion rate and the second tank exhaustion rate), the quantity of granular material in the tanks, and the projected tank depletion points (such as the projected first tank depletion point and projected second tank depletion point), the controller may further be configured, for example, by programming, to continually adjust the quantities of granular material in the tanks 220 of the tank assembly 218 to continually bring the projected tank depletion points closer together. In other examples, any adjustments may be made at specified time, distance, or location intervals or when the difference in the two tank volumes, levels, or weights exceed a predefined threshold. In some examples, the difference threshold may be determined to manage a machine operating parameter such as center of gravity, structural forces, or soil compaction.

Advantageously, this can be done largely without the input of the vehicle operator and can allow the controller 300 to adaptively adjust the granular material distribution in the tanks 220 of the tank assembly 218 in response to varying or unexpected conditions, with the aim of ensuring that the tanks 220 of the tank assembly 218 empty at the same or approximately the same time or the same location.

According to one aspect of the present disclosure, the controller 300 may also have access to data about a worksite, such as a field map of a worksite and data concerning a planting operation associated with the field map of the worksite. For example, the database 306 of the controller 300 may include or store site relevant data, such as a field map and planting or material application data associated with the field map, or such data may be transmitted to the controller 300. In some examples, planting data can include a projected planted area and projected seed consumption data associated with the field map and/or the projected plant area. In some examples, the projected seed consumption data can include consumption data for each individual tank 220 of the tank assembly 218. For instance, when the tank assembly 218 includes a first tank 220*a* and a second tank 220*b*, the seed consumption data can include a first tank consumption component associated with the first tank 220*a* and a second tank consumption component associated with the second tank 220*b*.

It will be appreciated that, in cases where the tank assembly 218 includes a different number of tanks, a different number of tank consumption components can be included in the planting data, such that there is a tank consumption component corresponding to each of the tanks 220. It will also be appreciated that, in some examples, the planting data can include a different number of tank components than there are tanks 220 in the tank assembly 218, such that one or more tanks is associated with more than one tank consumption component, or with no tank consumption components.

In such examples where projected data about the seed consumption from one or more of the tanks 220 of the tank assembly 218 is available, the controller 300 can generate a control signal 234C for the conveyor 234 based on this information. For example, the controller 300 can prepare a control signal 234C for the one or more conveyors 234 of the tank assembly 218 to transfer a seed material between the first tank 220*a* and the second tank 220*b* such that the first tank 220*a* arrives at a seed quantity based on the first tank consumption component, and the second tank 220*b* arrives at a seed quantity based on the second tank consumption component.

In some cases, this basis may be determined by a ratio between the first tank consumption component and the second tank consumption component, such that the ratio of the seed quantity in the first tank 220*a* to the seed quantity in the second tank 220*b* approximates or approaches the ratio of the first tank consumption component to the second tank consumption component. Advantageously, in such cases, it is not necessary to load each tank with close to the correct quantity of seeds to complete the portion of the planting job associated with that tank, because the controller is able to generate a signal to control the operation of the one or more conduits 234 to adjust the loaded quantities between the tanks 220 of the tank assembly 218.

Furthermore, in such examples, further input from a vehicle operator may not be needed to control the operation of the one or more conduits 234, because the requirements of a planned planting job are available to the controller 300, which can be configured to automatically adjust the seed levels within the tanks 220 of the tank assembly 218 to accommodate the needs of the planned planting job. Therefore, the reallocation of seeds between the tanks 220 can be automatic or substantially automatic, thus reducing the demands of the operation on the operator.

According to one aspect of the present disclosure, the tank exhaustion rates and/or the projected tank depletion points can also be communicated to the operator of the work vehicle 100. For example, the controller 300 can display such information on the display 310 for the vehicle operator. This advantageously allows the operator to make decisions to manually or directly activate the one or more conveyors of the tank assembly 218, which can be done, as previously described in relation to the conveyor 234, either by the input of a user command (for example, through the control station 110 or transmitted by a mobile device), or by manually actuating the one or more conveyors 234.

In some cases, it may also be desirable to adjust the balance of weight in the tanks 220 to improve the balance or handling of the work vehicle 100, or to avoid excessive soil compaction, which may result when one or more of the tanks 220 is too heavily loaded. In such cases, the tank sensors 252 of the tank assembly 218 can particularly be weight sensors, and the controller 300 can be configured to transfer seeds between the tanks 220 of the tank assembly 218 such that the weight in each tank reaches a target weight. For granular materials of approximately uniform density, volume data from a volume sensor or from a level sensor may be used to estimate weight. For example, when the tank assembly 218 includes the first tank 220*a* and the second tank 220*b* illustrated in FIGS. 2A-4, and previously discussed, a first target granular material weight (such as a first target seed weight) can be assigned to the first tank 220*a* and a second target granular material weight (such as a second target seed weight) can be assigned to the second tank 220*b*. Thus, the controller 300 can control the operation of the one or more conveyors 234 to move seeds between the first tank 220*a* and the second tank 220*b* until the weight of the seeds in the first tank 220*a* as measured by the weight sensor 252 corresponds to or approximates the first target seed weight and the weight of seeds in the second tank 220*b* corresponds to or approximates the second target seed weight.

According to one aspect of the present disclosure, the first target seed weight and the second target seed weight can be selected to provide a target ratio between the first target seed weight and the second target seed weight. This may be advantageous in providing a desired mass balance to the work vehicle 100 and/or to the work tool 200.

According to one aspect of the present disclosure, the first target seed weight and the second target seed weight can be selected to such that one of the first target seed weight or the second target seed weight does not exceed a target maximum granular material weight value (such as a target maximum seed weight value). This may be advantageous for cases in which distributing too much weight in one tank 220 risks overly-compacting a soil.

According to one aspect of the present disclosure, when the tank assembly 218 includes one or more conveyors 234 configured to expel seeds from one or more of the tanks 220, the controller 300 can also be configured to control such conveyors 234 by control signal 234C. Particularly, the controller 300 can receive instructions to begin expelling seeds and can generate a control signal 234C to control the operation of the conveyors 234 configured to expel seeds from the tanks 220. The control signal 234C can include an activation or deactivation command, and in some cases may also include a directional command (for example, a command for clockwise or counterclockwise rotation in cases where the one or more conveyors 234 include rotationally driven augers). In some cases, the instructions can come in the form of a command to completely empty the tanks 220. In such cases, the controller 300 can activate the conveyors 234 configured to expel material from the tanks 220 until the tank sensors 252 indicate that the tanks 220 are empty. In other cases, a control element accessible to the vehicle operator, for example, a button or switch, can allow the vehicle operator to activate the conveyors 234 for as long as the button or switch is depressed, or to toggle the conveyors 234 between an active and an inactive state.

Also disclosed herein are methods for controlling the state of a granular material, such as seeds, in a tank assembly such as the tank assemblies disclosed herein, using the conveyors and control systems described herein. It will be appreciated that, while the example below discusses a method for controlling seed levels, a substantially similar process may be used for other types of granular materials discussed herein. It will also be understood that, while the method example presented herein concerns the level of the granular material within the tank, other measuring criteria, such as weight, count, or volume may be used to determine the granular material quantity within the tanks 220. It will also be appreciated that while reference is made herein to a seeding operation, the disclosed method is similarly applicable to other planned granular material application operations.

According to one aspect of the present disclosure, a seed level control method 400 for redistributing seeds between tanks 220 in a tank assembly 218, according to any of the criteria discussed herein, is shown in FIG. 4. The seed level control method 400 includes a measuring step 402, during which the one or more tank sensors 252 measure the quantity, level, volume, or weight of the seeds in the tanks 220 of the tank assembly 218. According to one aspect of the present disclosure, multiple measurements can be taken in the measuring step 402, such that a trend of the contents of the tanks 220 can be established while the machine is in use, which may be useful in projecting or predicting a seed consumption weight, if no projections have been previously made before a seeding operation.

According to one aspect of the present disclosure, the seed level control method 400 also includes a predicting step 404, during which a projected granular material consumption rate (for example, a projected seed consumption rate where the granular material is seeds, as in the example disclosed herein) is obtained. It will be appreciated that the projected seed consumption rate can be obtained from various sources, as previously discussed herein. In some examples, the projected seed consumption rate can be calculated, for example by the controller 300, based on the rate of change of the seed level in the tanks 220 over multiple seed level measurements. In other examples, the projected seed consumption rate can be included in site data, such as site data contained in the database 306 of the controller 300, and may be specific to a worksite and planned planting operation, for example, the planned path of the planter through a field with planned seeding rates along the path. In some examples, such worksite related data can be included with and correspond to a worksite field map.

In some examples, the predicting step 404 may also include calculating a projected time of depletion for one or more of the tanks 220 of the tank assembly 218, which can be based at least in part on at least one of the calculated consumption rate or the site data.

According to one aspect of the present disclosure wherein the granular material is, for example seeds, the seed level control method 400 also includes a comparison step 406. During the comparison step 406, any data from the measuring step 402 or the predicting step 404 can be compared against granular material target values and/or granular material target states. For example, when the granular material is seeds, the quantity, level, volume, or weight of the seeds in the tanks 220 can be compared to target quantity, level, volume, or weight values. Similarly, if a granular material consumption rate (for example, a seed consumption rate) for one or more of the tanks 220 is calculated in the predicting step 404, it can be compared to a target granular material consumption rate (for example, a target seed consumption rate) for those tanks 220. In some examples, measurements of quantity, level, volume, weight, or consumption rate of the granular material, such as seeds, in the tanks can be used to calculate a corresponding empirical granular material state, which may reflect a relationship, such as a ratio, between the quantities of granular material in each tank 220. Thus, for example, a measured first granular material quantity, such as a first granular material weight and a measured second granular material quantity, such as a second granular material weight could be used to calculate an empirical granular material state, such as an empirical granular material quantity ratio.

The calculated empirical granular material state can thereafter be compared to a target granular material state, such as a target granular material quantity ratio and used to determine one or more parameters for the transfer of granular materials between the tanks 220. It will be appreciated that, while the example described herein pertains to seeds, and thus makes reference to seed quantities and seed ratios, the method is similarly applicable to any of the other granular materials disclosed herein.

For example, when the quantities of seeds in the tanks 220 are measured by the tank sensors 252, the comparison step 406 can include calculating an empirical seed quantity ratio from the measured seed quantities (such as a measured first seed quantity and a measured second seed quantity). This empirical seed quantity ratio can then be compared against a target seed quantity ratio, which may be obtained, for example, from previously prepared site data, or which can be based on the projected or calculated seed consumption ratios in the tanks 220 of the tank assembly 218.

Additionally, if the predicting step 404 includes predicting a depletion point, a time or a place of depletion for one or more of the tanks 220, that predicted point of depletion can be compared to a target point of depletion. Furthermore, in cases where the projected point of depletion is calculated for more than one tank 220, the projected points of depletion for each of the tanks 220 for which it is calculated can be compared against each other. It will be appreciated that, as discussed in detail herein, such comparisons can be useful in providing metrics by which to determine how much, if any, of the seed contents of the tanks 220 to move between the tanks 220.

According to one aspect of the present disclosure, the seed level control method 400 also includes a display step 408, in which collected and calculated data can be presented to the vehicle operator, for example on the display 310 of the controller 300, on some other instrument of the control station 110, or on a mobile device. In some examples, the display data can include current seed levels in each tank, projected seed consumption rates, depletion point information, and/or data on any comparison between measured or calculated values and target values, as well as warnings regarding measured and calculated values which do not align with target values. It will be appreciated that, in some instances, such as instances in which transfer of seeds between the tanks 220 of the tank assembly 218 is automatically controlled by the controller 300, the display step 408 may be omitted. It will also be appreciated that, even in such instances where user input is not needed to redistribute seeds between the tanks 220, the collected and/or calculated information may still be presented to the vehicle operator who may be co-located with the vehicle or located at a location remote from the vehicle.

According to one aspect of the present disclosure, the seed level control method 400 also includes determining whether to begin seed transfer between any of the work tool 200 in the tank assembly 218, as represented in decision block 410.

As disclosed herein, in some aspects of the present disclosure, the determination of whether to begin seed transfer (for example, by rotationally actuating one or more augers 244 of the one or more conveyors 234 of the tank assembly 218) can be made automatically by the controller, when, for example, any of the measured parameters, such as of quantity, level, weight, volume, or consumption rate, or any of the predicted parameters, such as predicted point of depletion, differ from the target values for those measured or calculated parameters. For example, for a tank assembly 218 including a first tank 220*a* and a second tank 220*b*, if the projected depletion point of the first tank 220*a* exceeds the projected depletion point of the second tank 220*b*, the controller may, in such examples, transmit a control signal 234C to engage one or more of the conveyors 234 to move seeds from the first tank 220*a* to the second tank 220*b*. Similarly, if the measured weight of the seeds in the second tank 220*b* exceeds the target maximum seed weight for the second tank 220*b*, the controller 300 may transmit a control signal 234C to engage one or more of the conveyors 234 to move seeds from the second tank 220*b* to the first tank 220*a*.

It will also be appreciated that in other aspects of the present disclosure, the decision to engage the one or more conveyors 234 of the tank assembly 218 may be made at the discretion of the operator based on the information presented in the display step 408.

According to one aspect of the present disclosure, the seed level control method 400 also includes an activation step 412. When the determination to activate the one or more conveyors 234 is made during decision block 410, the controller can transmit a switching signal 258S to the switch 258 to engage the one or more conveyors 234.

According to one aspect of the present disclosure, the seed level control method 400 also includes a verification step 414. During the verification step, further measurements are taken from the tank sensors 252 and/or further calculations are performed by the controller to reverify any of the measured, predicted, or calculated parameters against target values for those parameters. If previous transfer of seeds between the tanks 220 by the one or more conveyors 234 have not caused the measured, predicted, or calculated parameters to meet or at least closely approximate the target values for those parameters, a further transfer of seeds between the tanks 220 can be performed. It will be appreciated that the verification step 414 can be conducted while transfer of seeds between the tanks 220 is ongoing, particularly in cases where the transfer is automatically controlled. In this way, the controller 300 can control the operation of the one or more conveyors 234 to continually redistribute seeds such that the measured, predicted, or calculated parameters approach the target value, until the target values are reached or closely approximated by those measured, predicted, or calculated parameters, as indicated in decision block 416.

Once the target values for the various parameters are met, the one or more conveyors can then be deactivated, as indicated in the deactivation step 418 of the seed level control method 400, illustrated in FIG. 4.

Advantageously, when the tank assembly 218 is operated according to the steps of the seed level control method 400 it is not necessary for the operator of the work vehicle 100 to manually remove seeds from the first tank 220*a* and to add them to the second tank 220*b*, or vice versa, in order to achieve any of the objectives discussed herein. Rather, the transfer process can be controlled by the operator within the operator cab 106, can be controlled remotely, or can be automatically controlled by the controller 300.

Also disclosed herein are control methods for controlling the one or more conveyors 234 to expel seeds from the tanks 220 to partially or fully empty the tanks 220. An example of such a control method 500 is presented in FIG. 5 and describes an emptying operation that may be employed at the end of a planting operation.

According to one aspect of the present disclosure, the control method 500 includes a planning step 502. In the planning step 502, a future planting operation may be planned for. Particularly, it may be necessary to empty the tanks 220 of the tank assembly 218 of seeds if it is determined that the next planting operation requires a different seed, or to redistribute seeds between the tanks 220 if it is determined that the combined quantity of seeds in all tanks 220 is sufficient for the operation, but that the distribution of seeds between the tanks 220 is incorrect. If there is no need to change the seed in the tanks 220, it may not be necessary to empty the tanks 220. It will be appreciated, however, that even when there is no need to change seed types, it may still be desirable to remove the seeds from the tank, and the other steps of the control method 500 may still be conducted.

Figure 5:
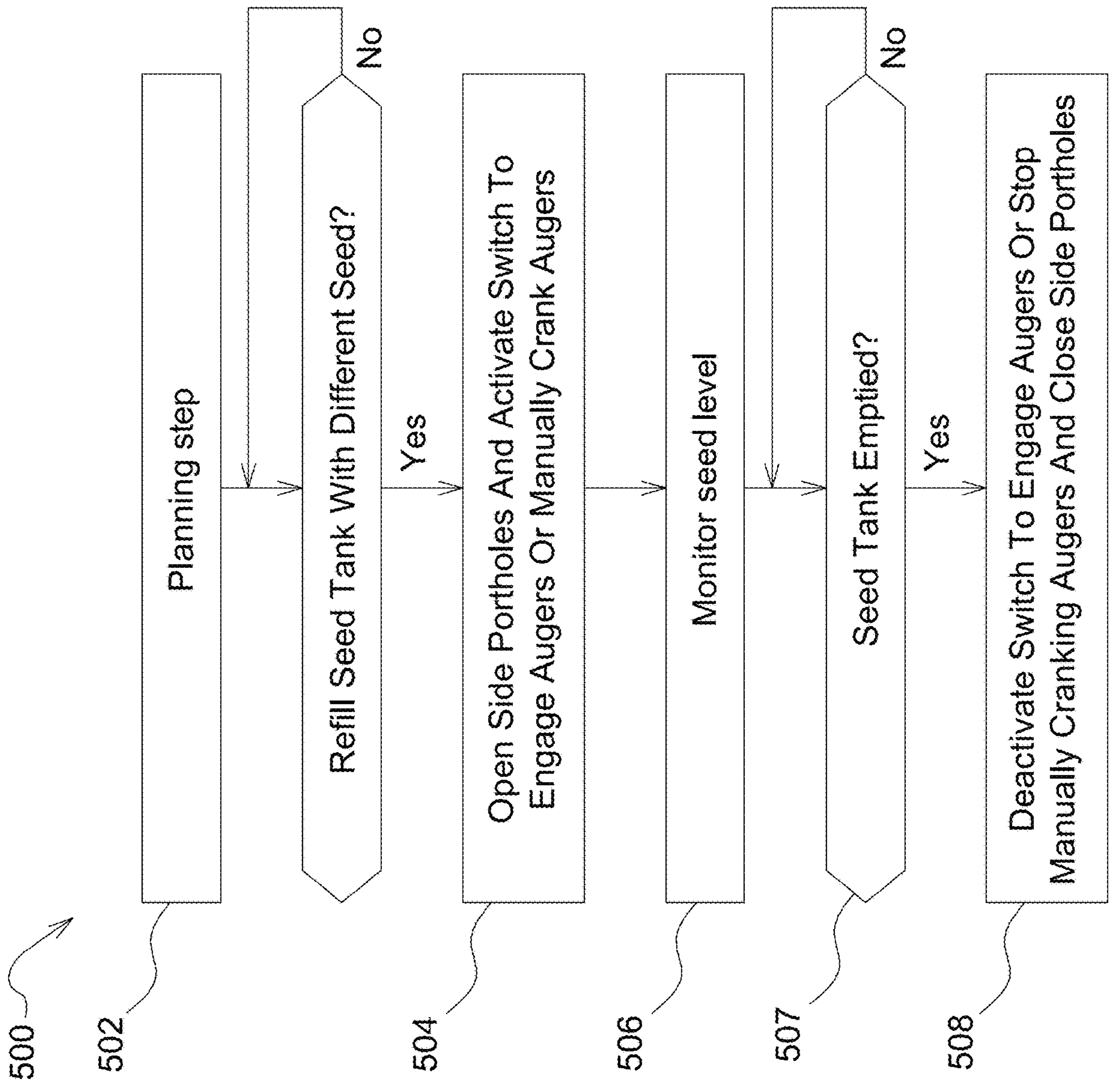
FIG. 5 is a flowchart outlining a control method according to another aspect of the present disclosure.

The control method 500 also includes an activation step 504, as illustrated in FIG. 5. Particularly, when it is desired to empty the tanks 220 of seeds, one or more conveyors 234 configured as expellers, as discussed previously herein can be activated (such as by rotationally actuating an auger or activating a fan or blower for a pneumatic conveyor) In some examples, activating the one or more conveyors 234 can be done by the controller 300, according to a predetermined plan. In other examples, activating the one or more conveyors 234 can be done by the operator of the work vehicle 100, by transmitting a command to the controller 300. In other examples activating the one or more conveyors 234 can be done by the operator of the work vehicle 100 by manually engaging a crank or motorized component to operate the one or more conveyors 234. When the one or more conveyors 234 are active, the seed is expelled from the tanks 220 through the egress port 248.

In some examples, the tank assembly 218 may include a cover over the egress port 248. In such examples, the activation step 504 can further include removing the cover from or otherwise opening the egress port 248. In some examples, this can be done manually by the operator of the work vehicle 100. In other examples, the cover can be attached to a mechanical actuator, which can be actuated by the controller 300 in response to programming or to a command signal from the operator to the controller 300 in order to open the egress port 248.

The control method 500 can, according to one aspect of the present disclosure, also cause a monitoring step 506. During the monitoring step 506, the tank sensors 252 can be monitored to continuously measure the quantity of seed in the tanks 220.

Particularly, the one or more conveyors 234 can be continuously run until the measured quantity of seed in the tanks 220 reaches or substantially reaches a target value (for example, zero if the intent is to empty the tanks 220), as indicated in decision block 507. It will be appreciated that the monitoring step 506 can continue while the one or more conveyors 234 are in operation, with continual measurements and updates to the data collected by the tank sensors 252.

According to one aspect of the present disclosure, the control method 500 can also include a deactivation step 508, as shown in FIG. 5. Once the measured quantity of seed in the tanks 220 reaches the target value, the one or more conveyors 234 can be deactivated and, if covers have been removed from the egress ports 248, the covers can be returned to the egress ports 248.

Advantageously, when the tank assembly 218 is operated according to the steps of the control method 500, it is not necessary for the operator of the work vehicle 100 to manually unload the tanks 220, for example by opening a bottom hatch of a tank 220.

Although there have been described particular embodiments of the present invention of a new and useful seed conveyor, it is not intended that such references be construed as limitations upon the scope of this invention except as set forth in the following claims.

What is claimed is:

1. A tank assembly for a work vehicle, comprising:

a first tank attached to and in communication with a granular material applicator;

a second tank attached to and in communication with the granular material applicator;

a first sensor associated with the first tank and a second sensor associated with the second tank; and a conveyor connecting the first tank to the second tank and configured to move a granular material between the first tank and the second tank.

2. The tank assembly of claim 1 further comprising a controller configured to receive a first signal from the first sensor and a second signal from the second sensor and to transmit a control signal to control the conveyor.

3. The tank assembly of claim 2, wherein the first sensor is a first quantity sensor and the second sensor is a second quantity sensor, wherein the first quantity sensor is configured to detect a granular material level in the first tank and the second quantity sensor is configured to detect a granular material level in the second tank, and wherein the first quantity sensor is configured to transmit a first granular material level signal to the controller and the second quantity sensor is configured to transmit a second granular material level signal to the controller.

4. The tank assembly of claim 3, wherein the controller is further configured to:

calculate a first tank exhaustion rate associated with the first tank and a second tank exhaustion rate associated with the second tank; and calculate a projected first tank depletion point based on the first tank exhaustion rate and a projected second tank depletion point based on the second tank exhaustion rate;

wherein when the projected first tank depletion point is longer than the projected second tank depletion point, the control signal controls the conveyor to transfer the granular material from the first tank to the second tank, and when the projected second tank depletion point is greater than the projected first tank depletion point the control signal controls the conveyor to transfer the granular material from the second tank to the first tank.

5. The tank assembly of claim 2, further comprising a database in communication with the controller, the database including a field map of a worksite and a projected granular material consumption associated with the worksite, wherein the projected granular material consumption includes a first tank consumption component and a second tank consumption component, and wherein the control signal controls the conveyor such that the first tank arrives at a first granular material level and the second tank arrives at a second granular material level, wherein a ratio of the first granular material level to the second granular material level is based on to the ratio of the first tank consumption component to the second tank consumption component.

6. The tank assembly of claim 2, wherein at least one of the first sensor or the second sensor is a weight sensor, and the control signal controls the conveyor such that the first tank arrives at a first target granular material weight and the second tank arrives at a second target granular material weight.

7. The tank assembly of claim 6, wherein the first granular material weight and the second granular material weight are selected to provide a target ratio between the first granular material weight and the second granular material weight and wherein the first granular material weight and the second granular material weight are selected such that one of the first granular material weight or the second granular material weight does not exceed a target maximum granular material weight value.

8. The tank assembly of claim 2, wherein the controller further comprises a user interface accessible to a vehicle operator, wherein the controller is configured to generate the control signal in response to a user input.

9. The tank assembly of claim 2, wherein the controller is associated with a program that automatically executes the transmission of the control signal to the conveyor.

10. The tank assembly of claim 1, wherein the conveyor comprises:

a conduit and an auger disposed in the conduit, and wherein when the auger is driven in a first rotational direction, the granular material is moved from the first tank to the second tank and when the auger is driven in a second rotational direction opposite to the first rotational direction, the granular material is moved from the second tank to the first tank.

11. The tank assembly of claim 1, wherein the conveyor comprises:

a first conduit and a first auger disposed in the first conduit; and a second conduit and a second auger disposed in the second conduit;

wherein the first auger is configured to convey the granular material from the first tank to the second tank and the second auger is configured to convey the granular material from the second tank to the first tank.

12. The tank assembly of claim 1, wherein the conveyor comprises a pneumatic system comprising a conduit and at least one of a blower or a vacuum system configured to pneumatically move the granular material between the first tank and the second tank through the conduit.

13. The tank assembly of claim 1 in combination with a work vehicle.

14. A method for controlling a state of a granular material within a granular material applicator comprising a first tank, a second tank, and a conveyor extending between the first tank and the second tank, wherein the granular material applicator is in communication with a controller, the method comprising:

measuring, by the controller, a first granular material quantity of the first tank;

measuring, by the controller, a second granular material quantity of the second tank;

obtaining, by the controller, a granular material target state;

calculating, by the controller, an empirical granular material state based on the measured first granular material quantity and the measured second granular material quantity;

comparing, by the controller, the empirical granular material state to the target granular material state;

generating, a control signal and transmitting the control signal to the granular material applicator, and in response to the control signal, driving the conveyor to convey a portion of the first granular material quantity to the second tank or the second granular material quantity to the first tank when the empirical granular material state is different from the granular material target state, such that the difference between the empirical granular material state and the granular material target state is reduced.

15. The method of claim 14, wherein the obtaining of the granular material target state comprises:

measuring a rate of change of the first granular material quantity;

measuring a rate of change of the second granular material quantity; and calculating the granular material target state from a ratio of the rate of change of the first granular material quantity to the rate of change of the second granular material quantity to generate the target granular material quantity ratio.

16. The method of claim 14, wherein the obtaining of the target granular material state comprises:

receiving a first signal communicating a first projected granular material consumption rate associated with the first tank;

receiving a second projected granular material consumption rate associated with the second tank; and calculating the target granular material state from a ratio of the first projected granular material consumption rate and the second projected granular material consumption rate.

17. The method of claim 16 wherein the first projected granular material consumption rate and the second projected granular material consumption rate are associated with a planned granular material application operation for a worksite.

18. The method of claim 14, wherein the obtaining of the granular material target state comprises calculating a first target weight for the first tank and a second target weight for the second tank.

19. A tank assembly comprising:

a tank defining an enclosure configured to receive a granular material material;

an egress port;

a conveyor positioned towards a bottom portion of the tank and extending between the egress port and the enclosure of the tank, wherein operation of the conveyor expels the granular material from the enclosure; and a controller configured to receive a first control signal and to transmit a second control signal to control an activation of the conveyor, wherein the controller is further configured to transmit a control signal to open or close the egress port.

* * * * *